United States Patent [19]

Yerkes

[11] 4,401,935
[45] Aug. 30, 1983

[54] CHARGE CONTROL APPARATUS AND METHOD

[75] Inventor: John W. Yerkes, Granada Hills, Calif.

[73] Assignee: Atlantic Richfield Company, Los Angeles, Calif.

[21] Appl. No.: 354,835

[22] Filed: Mar. 4, 1982

[51] Int. Cl.³ .............................................. H02J 7/00
[52] U.S. Cl. ........................................ 320/9; 320/14; 320/21
[58] Field of Search ........................ 320/2, 5, 8, 9, 10, 320/14, 19, 21, 27, 28, 39, 40

[56] References Cited

U.S. PATENT DOCUMENTS 3,419,779 12/1968 Zehner ................................... 320/40
3,673,485 6/1972 Vital et al. ............................... 320/5

Primary Examiner—William M. Shoop
Assistant Examiner—Anita M. Ault
Attorney, Agent, or Firm—Nilsson, Robbins, Dalgarn, Berliner, Carson & Wurst

[57] ABSTRACT

Apparatus and method for controlling the charging of an electrical energy storage device by an electrical energy source and controlling the discharging of the device through a load involve a relay actuable between a first condition coupling the storage device to the load and a second condition coupling the storage device to the source. When the electrical signal from the source reaches a preselected threshold level, the relay is actuated from the first condition to the second condition thereof for charging of the storage device by the signal. When the electrical signal generated by the storage device reaches a preselected charged level, the relay is reset from the second condition to the first condition to supply power to the load. In a preferred embodiment, an additional regulated source electrical signal may be applied to the storage device independently of the relay for float charging of the device.

14 Claims, 4 Drawing Figures

FIG. 3

CHARGE CONTROL APPARATUS AND METHOD

BACKGROUND OF THE INVENTION

This invention relates generally to the field of electrical energy production and storage and, more particularly, to an apparatus and method for controlling the charging and discharging of a rechargeable electrical energy storage device, such as a rechargeable battery, by an electrical energy source, such as a solar panel.

A number of techniques have been proposed for controlling the charging and discharging of a storage battery. When the signal from the source is subject to substantial variation, a voltage regulator is often used to lower the voltage of the signal from the source to the approximate voltage of the fully charged device. As the device is charged, the current from the regulator to the device automatically decreases as the device voltage increases, substantially terminating the charging when the voltage of the device is matched with the voltage of the source signal. The foregoing technique has been used to control the charging of rechargeable batteries by solar panels.

Another approach has involved direct charging of a storage battery through a relay, and, at other times, trickle charging through a regulator. The direct connection is terminated when a charge termination level has been reached, and may not be resumed until after the disconnected signal of the source has passed below a chosen level (at night) and subsequently passed above that level (when the sun rises).

Two other related techniques of charge control are disclosed in U.S. patent application Ser. No. 113,936, filed Jan. 21, 1980, having John W. Yerkes and Terry Staler as inventors, and U.S. patent application Ser. No. 222,208, filed Jan. 2, 1981, having Terry Staler as inventor, both of which have been assigned to Atlantic Richfield Company. These applications relate to apparatuses in which a direct connection between a solar panel and a battery is broken at preselected intervals to permit the voltage levels of the solar panel and the battery to be tested. The ratio of the voltages is examined upon disconnection to determine whether reconnection should be made. The technique of Ser. No. 222,208 involves a second float charge mode which is implemented when the solar panel and battery voltages indicate that direct charging should cease. It further incorporates discharging control in a context which requires manual intervention at a significant juncture.

Other techniques known to applicant for controlling the discharging of a battery through a load, in conjunction with charging control, involve disconnection of the load when the battery voltage passes below a discharge prevention threshold, and subsequent reconnection of the load when the battery voltage passes above a higher load reconnection threshold. As far as applicant is aware, such load control apparatuses have operated independently of any control of charging.

Therefore, in many applications, it is desirable to provide an apparatus and method for simply and economically controlling both the charging of a battery by an electrical source and discharging of the battery through a load, while protecting the battery from repeated deep discharge.

SUMMARY OF THE INVENTION

The present invention comprises an improved apparatus and method for controlling the charging of a rechargeable electrical energy storage device which generates a storage device electrical signal, by an electrical energy source which generates a source electrical signal, and controlling the discharging of the device through a load, the source having a charging output terminal and the load having a load input terminal, involving relay means actuable between a first condition coupling the storage device to the input terminal of the load for application of the storage device electrical signal to the load, and a second condition coupling the storage device to the output terminal of the source for charging the storage device by the source electrical signal; means for detecting a preselected threshold level of the source electrical signal; means for actuating the relay means from the first condition to the second condition in response to the preselected threshold level; and means for detecting a preselected charged level of the storage device electrical signal; said actuating means including means for resetting the relay means from the second condition to the first condition in response to the preselected charged level.

In a preferred embodiment, the storage device is directly connected to the output terminal of the source in the second condition of the relay means and the electrical energy source comprises a solar panel. The apparatus may further comprise means for independently regulating the source electrical signal to a preselected lower level and applying the regulated signal to the storage device for float charging thereof.

A significant feature of the apparatus and method of the present invention is its simplicity and efficiency. The battery is alternately connected either to a solar panel or a load, the transition between the two connections being initiated upon attainment of preselected threshold levels of solar panel output and battery charge, respectively. A single heavy duty relay thus serves to switch the apparatus from a condition of direct charging to one of discharging. Each morning when the sun causes the solar panel output to exceed a preselected minimum, the apparatus is automatically switched to a charging mode in which the solar panel is directly connected to the battery. The apparatus remains in this mode until the signal produced at the battery reaches a level indicating a preselected level of battery charge. At that time, the relay is de-energized, disconnecting the battery from the solar panel and connecting it to the load. Discharge of the battery through the load occurs until the next morning, at which time the rising solar panel voltage causes re-energization of the relay.

The present invention also serves to automatically disconnect a load each morning and reconnect it at night if the battery has been suitably charged. This method of operation has the advantage of turning off a load such as lights in the daytime if they are inadvertently left on from the previous night.

The circuit triggering the relay between the two conditions thereof may comprise a simple flip-flop acting through a relay driver. A comparator sets the flip-flop when the solar panel output exceeds a preselected value at the beginning of a day, and a pair of zener diodes acting through an inverter reset the flip-flop to its original state when the battery reaches a preselected charged level. This circuit is inexpensive to manufacture, yet extremely reliable in operation.

In a preferred embodiment, the apparatus of the present invention includes a regulator for float charging of the battery while the battery is connected to the load.

Additional charging of the battery is thus possible during any daylight hours remaining after the relay is triggered to connect the battery to load. A relatively small or intermittent "essential" load, such as a refrigerator, may also be connected across the battery independently of the relay. In such cases, the essential load preferably has a significantly lower average power consumption than the load switched through the relay.

BRIEF DESCRIPTION OF THE DRAWINGS

The above and other objects of the present invention may be more fully understood from the following detailed description, taken together with the accompanying drawings, wherein similar reference characters refer to similar elements throughout and in which:

FIG. 3 is a schematic diagram of a preferred embodiment of the apparatus of FIG. 1.

DESCRIPTION OF THE PREFERRED EMBODIMENTS

Figure 1:
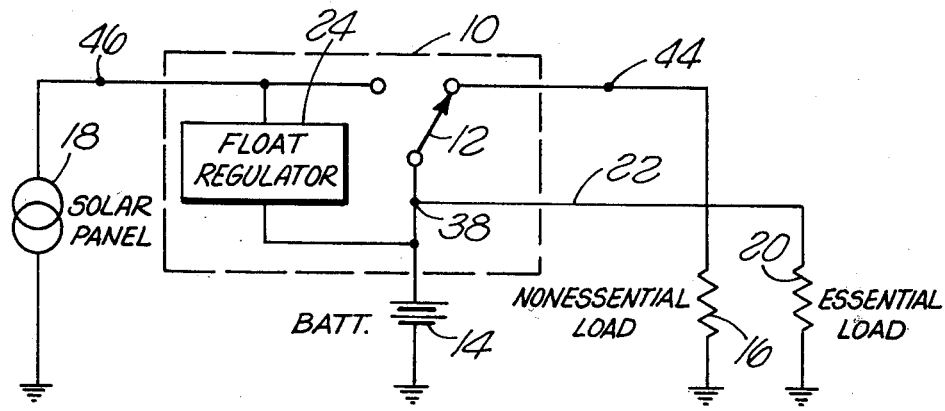
FIG. 1 is a simplified schematic view of an apparatus constructed in accordance with the present invention.

Referring now to the drawings, there is illustrated generally in FIG. 1 an apparatus 10 constructed in accordance with the present invention, in its operating environment. The apparatus 10 comprises generally a relay or other switching means 12 actuable between a first condition connecting a battery 14 to a load 16, and a second condition connecting the battery 14 directly to a solar panel 18. The battery is discharged through the load in the first condition and recharged by the solar panel in the second condition. The load 12 may, for example, be a number of lights or electrical appliances which operate only at night. There may be an additional load 20 which pulls a small amount of power and operates intermittently, such as a refrigerator. Such a load would be connected at all times to the battery 14, as shown by the lead 22. A float regulator 24 may also be provided across the contacts of the relay 12 to permit float charging of the battery by the solar panel when the relay is in the first condition described above. As will be described more fully below, the switching of the relay 12 is accomplished automatically by a NAND gate arrangement.

Figure 2:
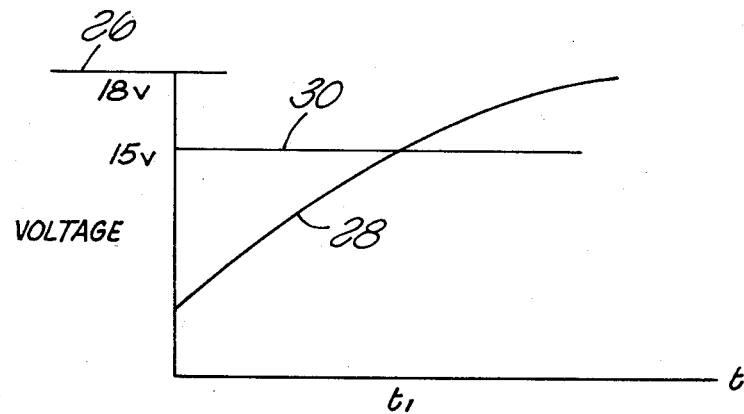
FIG. 2 is a generalized graphical representation of the direct charging characteristic of the apparatus of the present invention in conjunction with a battery.

The relay 12 operates in response to an increasing output from the solar panel 18 to switch from the first condition to the second condition, disconnecting the battery from the load 16 and connecting it directly to the solar panel 18. Thus, when the solar panel output surpasses a preselected threshold level, the relay 12 acts to connect the panel to the battery for direct charging of the battery. The solar panel continues to charge the battery until the battery reaches a preselected level of charge, at which point the relay 12 acts to disconnect the battery from the solar panel and reconnect it to the load 16. The direct charging process can be seen graphically in somewhat simplified form in FIG. 2, wherein an assumed open circuit solar panel voltage of 18 volts is shown at 26. The curve 28 of FIG. 2 represents the common voltage of the solar panel and the battery when the two are coupled for direct charging in the second condition of the relay 12. The coupled voltage is thus an intermediate value between the solar panel voltage and the voltage of the discharged battery. Direct charging of the battery is allowed to continue until the coupled voltage reaches a preselected value 30, such as 15 volts, indicating that a desired level of battery charge has been reached. At this time, designated $t_1$ in FIG. 2, the relay 12 is returned to its first condition, disconnecting the battery from the solar panel and reconnecting it to the load 16. The relay remains in this position until the following day when the sun again activates it to the direct charging mode, as above described. In the event that additional sun charge time is available after the relay is returned to its first condition, the float regulator 24 permits additional charging of the battery 14 during the day. This additional charging can be used to offset any load usage during the same period or, if a sufficiently high float charge level is chosen, may act to charge the battery to an even higher level than that achieved during direct charging. The latter case is desirable in many circumstances where full charging of the battery in the direct charge mode would produce an undesirably high level of gassing of electrolyte.

Figure 3:
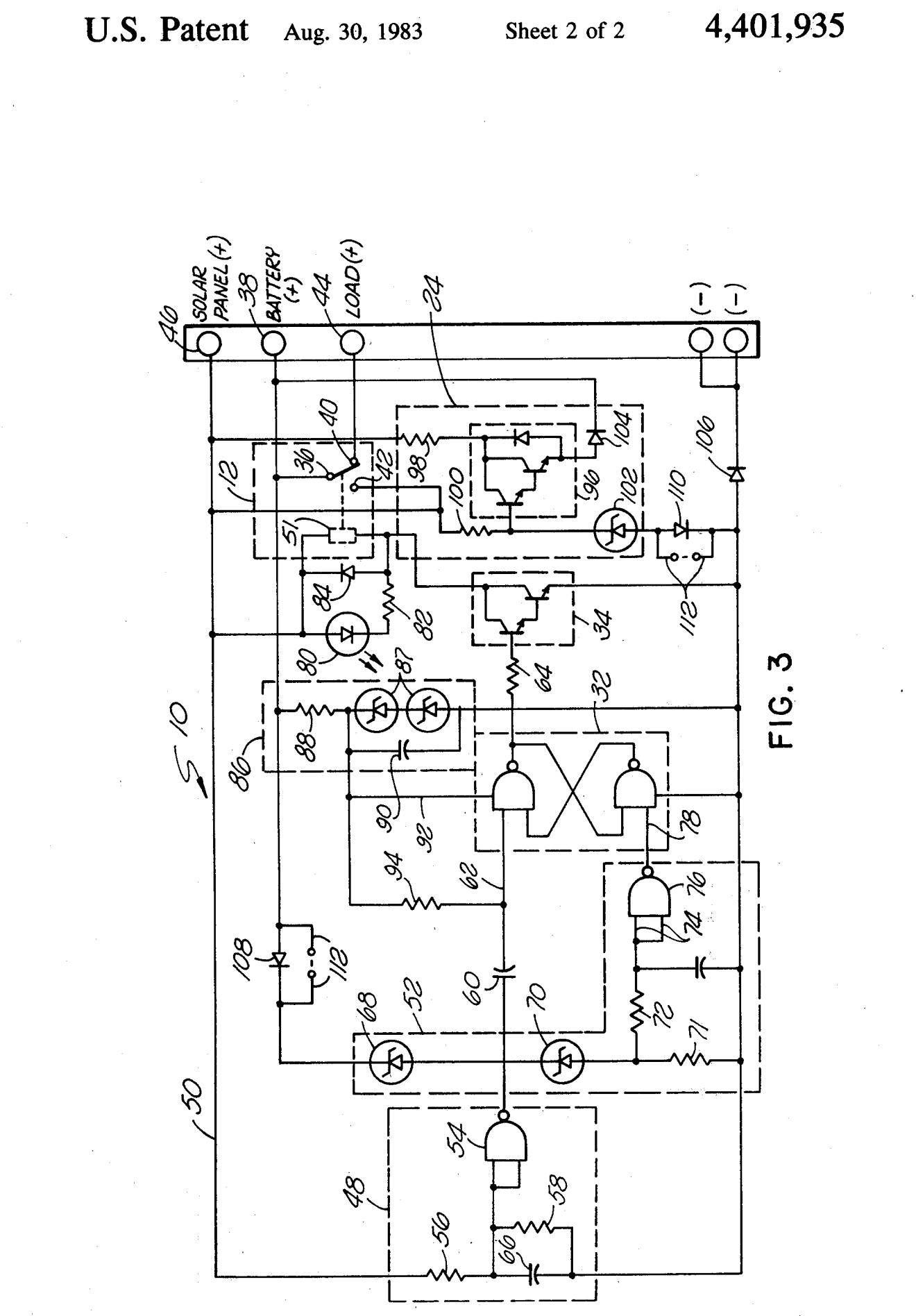

Referring now to the more detailed showing of the apparatus 10 in FIG. 3, the relay 12 is actuated between the first and second conditions thereof through a flip-flop 32 and a relay driver 34. The relay 12 includes a movable contact pin 36 connected to a battery terminal 38, and a pair of fixed contact pins 40 and 42. The contact pins 40 and 42 are directly connected to a load terminal 44 and a solar panel terminal 46, respectively. The relay 12 is thus actuable between the first condition illustrated in FIG. 3, in which the battery is connected to the load for discharge, and a second condition in which the movable element of the relay connects the pins 36 and 42 for direct charging of the battery.

For purposes of the ensuing discussion of FIG. 3, it will be assumed that the relay 12 is initially in the first condition thereof and that the battery has been discharged to some extent during the night by operation of lights, television sets or the like. It will further be assumed that the sun is rising and falls upon the solar panel, causing it to begin producing electrical current. A solar panel detector circuit 48 receives the output signal from the solar panel along a line 50 and sets the flip-flop 32 when the signal reaches a preselected threshold level. This level, which may be on the order of 10 volts, signifies the beginning of the day's charging cycle. The output of the flip-flop 32 then activates the relay driver 34 which energizes the relay 12 by drawing current through a coil 51 thereof. The apparatus is thus placed in its direct charging mode. During direct charging, the coupled voltage of the solar panel and the battery is monitored by a trigger voltage detector circuit 52. When the coupled voltage reaches a preselected maximum, for example 15 volts, the circuit 52 acts to reset the flip-flop 32 and deactivate the relay driver 34. The current flow through the coil 51 of the relay 12 is thus reduced below the level necessary to hold the relay in the second condition thereof, allowing it to return to the first condition. The battery is thus discharged through the load for the remainder of the day and night. Any additional charging during that day must be accomplished by the float regulator 24 which is connected across the pins 36 and 42 of the relay. Direct charging does not take place again until the detector circuit 48 is activated by the solar panel the next morning.

The detector circuit 48 comprises a NAND gate 54 whose inputs are shorted and connected across a voltage divider made up of the resistors 56 and 58. The NAND gate 54 thus acts as an inverter of the signal across the resistor 58, which is proportional to the signal generated by the solar panel. When the input to the gate 54 is high, the output is low, and vice versa. Before the sun rises, the solar panel does not create appreciable electric current, causing the input to the gate 54 to be low and the output high. As sunlight begins to fall on the solar panel, the signal along the line 50 begins to rise. When the voltage across the resistor 58 increases to a threshold value equal to approximately ½ the operating voltage of the gate 54, the output of the gate drops off to a low value. This voltage change is integrated by a capacitor 60 positioned between the gate 54 and an input pin 62 of the flip flop 32. The sudden dropoff in voltage of the gate 54 is thus transformed by the capacitor 60 into a downward voltage spike at the pin 62. The downward spike acts to set the output of the flip-flop 32 to a high condition for energizing the relay driver 34 through a series resistor 64. This flip-flop setting operation takes place only once each day, when the solar panel output signal reaches a value sufficient to exceed the threshold of the gate 54. The output of the gate 54 reassumes a high level when the solar panel ceases generating current, preparing the gate 54 for the rise in input the next morning which will cause the output to again change from high to low. A capacitor 66 is provided across the resistor 58 to filter out noise from intermittent load changes and other conditions which could produce false triggering of the circuit 48.

During the direct charging operation, the coupled voltage of the solar panel and the battery are monitored by the detector circuit 52. Upon reaching a preselected charged value, the zener diodes 68 and 70 fire through a grounded resistor 71. This produces a voltage drop across a resistor 72 and a temporary high condition at the shorted inputs 74 of a NAND gate 76. The output of the gate 76 thus goes from an initial high value to a temporary low value applied to a second input pin 78 of the flip-flop 32. This high to low transition "resets" the flip-flop, causing its output to go low. The low output shuts off the relay driver 34 to de-energize the coil 51 of the relay 12. The relay 12, which is biased to the first condition thereof, is therefore permitted to return to the first condition for discharge of the battery through the load.

A light-emitting diode (LED) 80 is placed in series with a resistance 82 across the relay coil 51. Current is drawn through the LED 80 when the relay driver is activated, visually indicating that the relay 12 is in the second condition and that the battery is being charged. The LED 80 thus serves as a "low battery" indicator which is illuminated when the battery is in the direct charging phase. A separate snubber diode 84 is also connected across the relay coil 51 for spike suppression when the relay is de-energized.

A power supply 86 is connected across the battery to provide operating power to the flip flop 32 and the NAND gates 54 and 76. The power supply comprises a pair of zener diodes 87 connected to the battery terminal 38 through a resistor 88, with a capacitor 90 connected across the diodes. The zener diodes 87 operate in the breakdown region to apply a voltage of approximately 5 volts to the flip-flop 32 and the two individual NAND gates. This voltage is supplied to the flip-flop 32 through a conductor 92, and to the NAND gates 54 and 76 by other suitable conductors (not shown). The signal produced by the zener diodes is also applied to the input pin 62 of the flip-flop 32 through a resistor 94. The resistor 94 preferably has approximately 100 times as high a value as the resistor 88.

Figure 4:
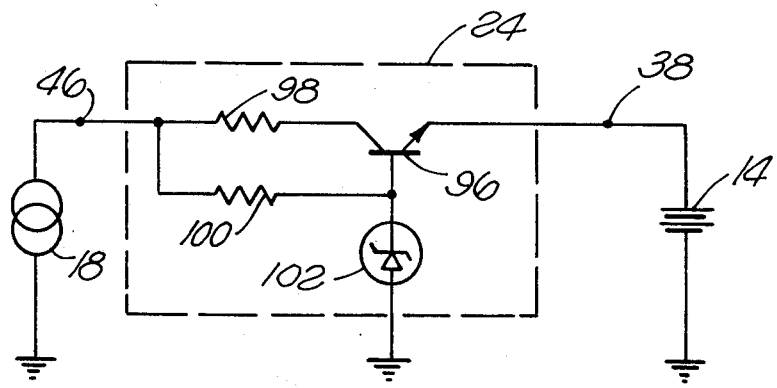
FIG. 4 is a somewhat simplified circuit corresponding to the float charge regulator within the apparatus of FIG. 3.

Referring now to FIG. 4, there is illustrated a somewhat simplified circuit of the float regulator 24. The regulator 24 is a simple series pass regulator element 96 having a series impedance 98 in the collector circuit thereof to limit the current applied to the battery and thereby protect the regulator. The regulator element 96, while illustrated as a transistor in FIG. 4, is preferably a Darlington type circuit of the type shown generally in FIG. 3. The series impedance element 98 is connected between the solar panel terminal 46 and the collector of the element 96, with the emitter of the element 96 connected to the battery terminal 38. A biasing resistor 100 is connected between the solar panel terminal and the base of the element 96, the base being grounded through a zener diode 102.

During the daylight hours, the relationship between the output voltage of the solar panel 18 and the voltage of the battery 14 is such that the emitter-base portion of the element 96 will be forward biased and current will flow through the transistor to the battery for charging. The series impedance element 98, which may have a resistance of approximately one-third ohm, limits the flow of current through the regulator 96 to a safe level. The regulator element 96 and the impedance element 98 together comprise a variable impedance in the regulator circuit which corresponds to a voltage drop of approximately 2.4 volts minimum. When the solar panel 18 is designed to operate at the knee of its V-I curve in the direct charging mode, as is the case in the preferred embodiment of the present invention, the introduction of the additional impedance causes the panel to operate at a voltage above its maximum power point. The charging current passed to the battery 14 is thus decreased by a factor of 5 or 10, and the panel operates at a fraction of the power of the direct charging mode. The battery is able to accept further charge at this rate without undue gassing of electrolyte, and the desired float charge regulation can be easily and inexpensively achieved.

The level of charge imparted to the battery 14 by the float regulator is limited by a zener diode 102 connected between the base of the element 96 and ground. For a battery voltage of approximately 11 volts, the base of the element 96 would be approximately 11.5 volts in the configuration of FIG. 4 or approximately 12 volts in the two-stage configuration of FIG. 3. This is because the voltage drop across each diode is approximately ½ volt and the emitter base circuit is forward biased. In this condition, charging occurs through the series resistance element 98 and the transistor. As the battery 14 becomes increasingly charged, the voltages at the emitter and base of the element 96 increase accordingly such that the difference between those voltages remains the same. The battery voltage eventually reaches a level such that the voltage at the base of the element 96 will exceed the breakdown voltage of the zener 102, thereby shunting the excess solar panel voltage to ground through the resistor 100. At that point, the battery voltage has reached its maximum, corresponding to a preselected amount less than the breakdown voltage of the zener.

In the apparatus of FIG. 3, the zener voltage is preferably chosen to be approximately 15 volts, establishing a maximum float charge level of 14 volts at the battery. This is the voltage level of the battery coupled to the float regulator 24 in the daylight, assuming a nominally 12 volt battery having a fully charged open circuit voltage of approximately 12.7 volts. The voltage of the battery is thus drawn upwardly while it is charged by the float regulator 24, due to the coupling effect discussed above in relation to the direct charging mode. The voltage of the battery and the apparatus to which it is attached represents an intermediate value between the open circuit voltages of the battery and the apparatus.

Referring again to FIG. 3, a pair of diodes 104 and 106 are connected in the emitter circuit of the float regulator 24 and the ground circuit of the entire apparatus 10, respectively, to protect against undesirable back currents. The diode 104 thus protects against discharge of the battery through the regulator circuit when the solar panel voltage is down, and the diode 106 protects against damage due to inadvertent reverse connection of the battery. Two other diodes 108 and 110 are connected in the detector circuit 52 and the base circuit of the regulator element 96 to permit fine tuning of the circuit to the charging requirements of particular types of batteries. Jumpers 112 are provided at each of these diodes for shorting across them, if desired. Each diode represents a voltage drop of approximately one-half volt in the circuit.

In operation, it is initially assumed that the solar panel is dark and that the relay is in the position shown in FIG. 3. The battery is thus connected to the load for discharging during the night. Upon the advent of daylight, the voltage across the resistor 58 increases to the threshold of the NAND gate 54, causing it to go low and produce a negative spike at the input pin 62 of the flip-flop 32. The flip-flop is thus set at a high output to activate the relay driver 34 and energize the relay coil 51. This draws the movable contact of the relay 12 against the pin 42 to disconnect the battery from the load and connect the battery to the solar panel. This condition persists until the coupled voltage of the battery and the solar panel exceeds a preselected trigger voltage of the detector circuit 52, preferably approximately 15 volts, at which point the zeners 68 and 70 fire to produce a positive signal at the shorted input 74 of the NAND gate 76. The output of the NAND gate then goes low, resetting the flip-flop 32 to a low condition and deactivating the relay driver. The relay is thus de-energized and allowed to return to the first condition shown in FIG. 3, so that the battery can be used for the remainder of the day and night to power the load 16. In the first condition, the regulator 24 acts to apply a float charge signal to the battery for the remainder of the daylight hours. This float charge signal serves to further charge the battery at a reduced rate and to offset the discharge of the battery through the load. Upon return of the relay to the first condition, the battery falls from the direct charge coupled voltage of approximately 15 volts to a float charge coupled voltage of 13.8 volts, and a float charge current of between one-half amp and one amp flows to the battery until it reaches a coupled voltage of 14 volts. At that point, the open circuit voltage of the battery is approximately 12.7 volts, corresponding to the fully charged state of a 12 volt battery. The battery is effectively uncoupled from the solar panel at night when the solar panel output falls off, lowering the load voltage to that produced by the battery alone. Discharge of the battery through the load will thus continue until the solar panel voltage again rises to the threshold value.

If, in the course of a day's operation, the coupled voltage of the solar panel and the battery in the direct charging mode fails to reach the trigger voltage (15 volts), the load will not be connected to the battery that day or the following night. This prevents deep discharge of the battery. The load will not be reconnected until the battery has been sufficiently charged in the direct charging mode during subsequent days. This condition indicates that the existing solar panel has insufficient capacity to operate the connected loads. The solution is to either add another solar panel to the system or reduce the loads.

In the construction of the apparatus 10, the relay driver 34 may be any suitable element operable to energize and de-energize the relay coil 51 in the manner described above. A commercially available element for this purpose is identified generically as 2N6725. As shown schematically in FIG. 3, this element is essentially a Darlington circuit with suitable biasing (not shown). Similarly, the series pass regulating element 96 may be any suitable commercially available element, such as that identified generically as 2N6387. The NAND gates 54 and 76, and the NAND gates making up the flip-flop 32, may be any suitable elements, such as those available under the generic designation CD4093B.

What is claimed:

1. Apparatus for controlling the charging of a rechargeable electrical energy storage device which generates a storage device electrical signal, by an electrical energy source which generates a source electrical signal, and controlling the discharging of the device through a load, the source having a charging output terminal and the load having a load input terminal, comprising:

relay means actuable between a first condition coupling the storage device to the input terminal of the load for application of the storage device electrical signal to the load, and a second condition coupling the storage device to the output terminal of the source for charging of the storage device by the source electrical signal;

means for detecting a preselected threshold level of the source electrical signal;

means for actuating the relay means from the first condition to the second condition in response to said preselected threshold level; and means for detecting a preselected charged level of the storage device electrical signal;

said actuating means including means for resetting the relay means from the second condition to the first condition in response to said preselected charged level.

2. The apparatus recited in claim 1 wherein the storage device is connected directly to the output terminal of the source in the second condition of the relay means.

3. The apparatus recited in claim 2 wherein the electrical energy storage device comprises rechargeable battery means and the electrical energy source comprises solar panel means.

4. The apparatus recited in claim 3 which further comprises means for regulating the source electrical signal to a preselected lower level and applying the regulated signal to the storage device independently of the relay means for float charging of the device.

5. The apparatus recited in claim 4 wherein the regulating means comprises a series pass regulator connected to the storage device independently of the relay means.

6. The apparatus recited in claim 3 wherein the actuating means comprises flip-flop means acting through relay driver means, the flip-flop means being actuable between first and second flip-flop conditions corresponding to the first and second conditions of the relay means.

7. The apparatus recited in claim 6 wherein the actuating means, the threshold level detecting means and the charged level detecting means comprise NAND gate arrangements.

8. The apparatus recited in claim 3 wherein the charged level detecting means comprises zener diode means acting through comparator means.

9. The apparatus recited in claim 3 which comprises means for coupling a second lower average load to the storage device independently of said relay means.

10. Method for automatically controlling the charging of a rechargeable electrical energy storage device which generates a storage device electrical signal, by an electrical energy source which generates a source electrical signal, and controlling the discharging of the device through a load, the source having a charging output terminal and the load having a load input terminal, comprising:
alternately connecting the storage device either to the input terminal of the load for application of the storage device electrical signal to the load, or to the output terminal of the source for charging of the storage device by the source electrical signal, depending upon the levels of the source electrical signal and the storage device electrical signal.

11. Method for automatically controlling the charging of a rechargeable electrical energy storage device which generates a storage device electrical signal, by an electrical energy source which generates a source electrical signal, and controlling the discharging of the device through a load, the source having a charging output terminal and the load having a load input terminal, comprising:
detecting a preselected threshold level of the source electrical signal;
breaking an electrical coupling of the storage device to the load and establishing an electrical coupling of the storage device to the source each time the source electrical signal passes above the preselected threshold level;
detecting a preselected charged level of the storage device electrical signal; and
breaking the coupling to the source and reestablishing the coupling to the load each time the storage device electrical signal reaches the preselected charged level;
whereby alternate charging and discharging of the storage device is accomplished indefinitely.

12. The method recited in claim 11 wherein the storage device is coupled directly to the output terminal of the source each time the source electrical signal passes above the preselected threshold level, and the electrical energy source comprises solar panel means.

13. The method recited in claim 12 which further comprises regulating the source electrical signal to a preselected lower level and applying the regulated signal to the storage device for float charging thereof when the storage device is coupled to the load.

14. The method recited in claim 13 which further comprises coupling a second lower average load to the storage device, such that electrical power is available to the second load at all times.

* * * * *